Sept. 21, 1965  J. R. CRUMP  3,206,845
APPARATUS FOR JOINING PIPE SECTIONS
Filed Jan. 16, 1963

Joseph R. Crump
INVENTOR.

BY
ATTORNEY

United States Patent Office 3,206,845
Patented Sept. 21, 1965

3,206,845
APPARATUS FOR JOINING PIPE SECTIONS
Joseph R. Crump, 2018 Timberlane, Houston, Tex.
Filed Jan. 16, 1963, Ser. No. 251,915
11 Claims. (Cl. 29—282)

This invention relates to pipe joining apparatus and more particularly it relates to means for quickly and easily joining together pipe sections in a coupling so as to provide a fluid-tight joint between the pipe sections and to further provide means for positively preventing pressures within the pipe sections from causing movement of the pipe sections away from each other.

According to a preferred embodiment of this invention, the adjacent ends of two pipe sections to be joined are substantially abutted within a coupling and an explosive charge is utilized to cause the pipe ends to be expanded within the coupling so the pipe ends are rigidly retained within the coupling in a fluid-tight engagement. The explosion is accomplished in a sealed-off space spanning the substantially abutting ends of the pipe sections and extending substantially the length of the coupling, the sealed-off space being formed, in one embodiment, by means of expansible packers carried within the pipe sections.

Figure 1:
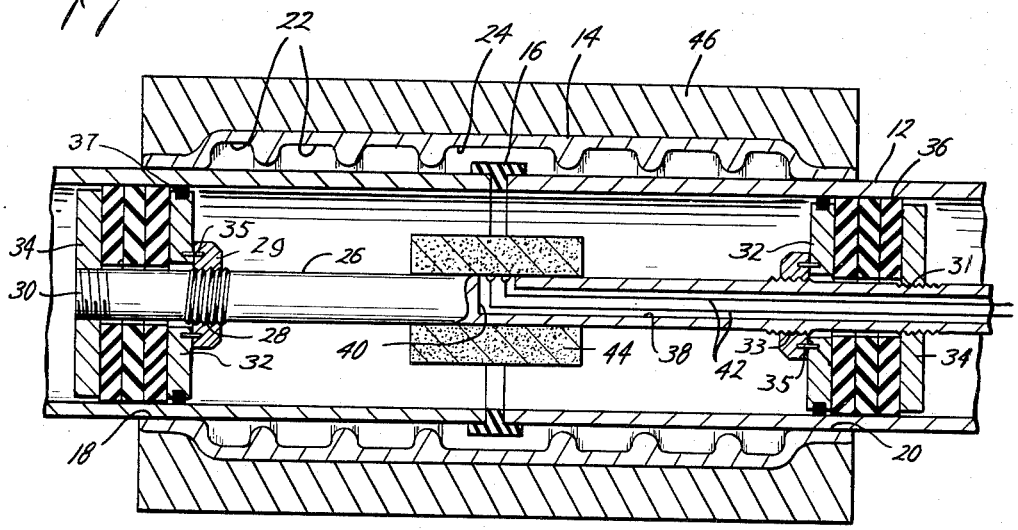
Figure 2:
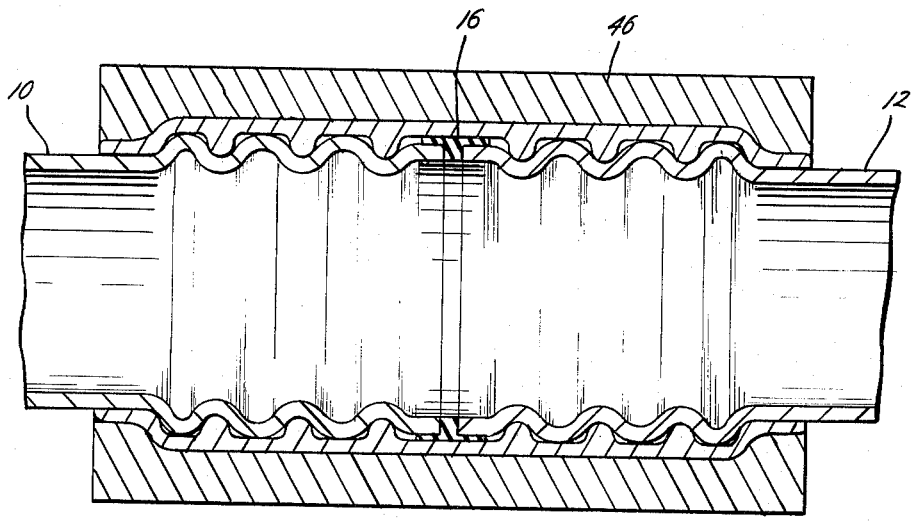

For a better understanding of the invention reference is now made to the accompanying drawings wherein FIGURE 1 is a longitudinal sectional view of one embodiment of the apparatus used in the practice of the invention; and FIGURE 2 is a longitudinal sectional view of a pipe joint made according to one embodiment of this invention.

As seen in FIGURE 1 of the drawing, the adjacent ends of two pipe sections 10 and 12 are substantially abuttingly received within a cylindrical coupling 14. The ends of the pipe sections engage a plastic seal ring 16 which has a T-shaped cross-section so that a portion of the seal ring surrounds the adjacent ends of the pipe sections and a portion extends between the ends of the pipe sections. The coupling is reduced in diameter at its ends 18 and 20 so as to provide a relatively close slip fit of the ends of the coupling upon the pipe sections. Intermediate the ends the coupling is provided with a plurality of annular inwardly directed grooves 22, including a central groove 24. As seen in the drawing, groove 24 surrounds the plastic seal ring 16. A relatively heavy-walled split clamp or retaining rings 46 surrounds the coupling and is in close engagement with substantially the entire outer surface of the coupling.

A rod 26 extends longitudinally of the pipe sections and spans the portions of the pipe sections within the coupling and its other end extends out the remote end of one of the pipe sections 12. The end of the rod which is within the end 18 of the coupling is provided with enlarged left hand threads 28 which threadedly receive a nut 29, and right hand threads 30, upon which packer end plate 34 is threadedly engaged. A packer pressure plate 32 and a plurality of resilient plastic packer discs 36 are slidably received upon the rod intermediate the nut 29 and the packer end plate 34. A packing ring 37 encircles the packer pressure plate and is adapted to sealingly engage the pipe wall. Similar left hand and right hand threads 31 and 33 are provided upon the rod at a point spaced away from the first mentioned threads and substantially within the end 20 of the coupling. Here also a nut 29 and a packer end plate 34 are threadedly engaged upon the rod and encompass between them a packer pressure plate 32 and a plurality of resilient plastic packer discs 36. The two sets of packer discs and packer plates comprise expansible packers adapted to sealingly engage the walls of the pipe sections. In a preferred embodiment, the packer discs have a normal diameter slightly larger than the diameter of the pipe sections, so that friction will prevent the packer discs from rotating when the rod is rotated. Pins 35 on nuts 29 engage pressure plate 32 and prevent relative rotation therebetween.

The rod 26 is provided with a longitudinal passageway 38 which extends to approximately midway between the packers, where it is intersected by a lateral passageway 40 which opens into the space intermediate the packers. An explosive charge of a type well known in the art is mounted upon the rod at approximately this midpoint, and conductors 42 lead from this explosive charge through the passageways to the remote end of the rod.

It should be apparent from the foregoing description and the accompanying drawings that the rod together with the packers and the explosive charge thereof is inserted into the pipe sections until the space between the packers spans the portions of the pipe sections within the coupling. At this time the nuts 29 have been tightened to hold the packer plates snugly against the packer discs so that friction therebetween will prevent the packer plates from rotating when the rod 26 is rotated. Then by manipulation of the rod, i.e. by rotation in the embodiment shown in the drawing, the nuts 29 and the packer end plates 34 are caused to move together on the threads 28, 30, 31 and 33 so as to expand the resilient packer discs 36 into sealing engagement with the walls of the pipe sections 10 and 12. Thus a pressure-tight space is provided intermediate the packers. An electrical signal is then passed through the conductors 42 to the explosive charge 44 to cause the charge to explode and deform the pipe ends within the coupling in the manner shown in FIGURE 2. The pressure generated by the explosion causes pressure plates 32 to move longitudinally relative to the rod 26 so as to further tighten the packers within the pipe ends and thereby provide positive means to resist the tendency of the pipe ends to be moved out of the coupling by the force of the explosion, and further insures a pressure-tight enclosure to contain the force of the explosion.

Following dissipation of the explosive force, gaseous products may bleed off through the passageways 38 and 40. The rod 26 may then be rotated in the opposite direction to allow the packers to retract from sealing engagement with the walls of the pipe sections so that the rod with its associated apparatus may be withdrawn from the pipe. Clamp 46 is then removed and the joint is complete.

Preferably the coupling 14 is made of a more resilient material than the pipe sections so that the coupling will spring back more to insure a tighter engagement between the coupling and the pipe ends. Either with or without such more resilient material in the pipe coupling the use of a heavy clamp 46 around the pipe coupling is often found to be of value so as to prevent undesired deformation of the pipe coupling upon explosion within the pipe joint.

It will be seen that the plastic seal ring 16 intermediate the substantially abutting ends of the pipe sections is deformed during the explosion and is tightly engaged between the outer walls of the pipe sections and the wall forming the central groove 24 so as to insure a pressure-tight seal being formed within the coupling. If desired the provision of pressure tightness may be further insured by the use of conventional sealing compounds within the groove 22.

Although a preferred embodiment of the invention has been shown and described herein the invention is not limited thereto but only as set forth by the following claims.

I claim:

1. An explosive unit for insertion into a tubular member which comprises
   a rod,
   a pair of expansible packers on said rod,
   means on said rod for expanding said packers,
   an explosive charge on said rod intermediate said packers, and
   means for igniting the explosive charge.

2. Apparatus as defined by claim 1 wherein each packer includes means actuable by the force of explosion of the explosive charge to cause an increase in the tightness of the packer in the tubular member.

3. Apparatus as defined by claim 1 wherein each packer is adapted to be radially expanded by longitudinal pressure, and includes a pressure plate on the side nearest the explosive charge, the pressure plate being movable longitudinally relative to the rod by the force of explosion of the explosive charge so as to further tighten the packers in the tubular member.

4. Apparatus for joining pipe sections within
   a coupling adapted to surround the adjacent ends of two abutting pipe sections,
   said apparatus comprising
   a rod adapted to be inserted into said pipe ends to span the abutment,
   an expansible packer on said rod on each side of said abutment operable to enclose a space having a length less than the coupling length.
   means on said rod for expanding said packers,
   an explosive charge on said rod intermediate said packers, and
   means for igniting the explosive charge.

5. Apparatus as defined by claim 4, and including
   a longitudinally extending passageway in said rod terminating intermediate said packers, and
   a lateral passageway in said rod providing communication between said longitudinal passageway and said enclosed space,
   and wherein said means for igniting the explosive charge comprises
   an electrical conductor in said passageways leading to said explosive charge.

6. Apparatus as defined by claim 4 wherein said packers are caused to expand by axial force.

7. Apparatus as defined by claim 6, and including
   a longitudinally extending passageway in said rod terminating intermediate said packers, and
   a lateral passageway in said rod providing communication between said longitudinal passageway and said enclosed space,
   and wherein said means for igniting the explosive charge comprises
   an electrical conductor in said passageways leading to said explosive charge.

8. Apparatus as defined by claim 6 wherein each packer comprises
   an end plate threadedly engaging said rod,
   a pressure plate longitudinally slidably disposed on said rod, and
   at least one resilient packer disc intermediate said end plate and said pressure plate,
   and the means on said rod for expanding each packer comprises
   a nut threadedly engaging said rod and engaging the pressure plate, whereby relative rotation of said rod and said nut causes a change in the axial force applied to the packer disc by the pressure plate and the end plate.

9. Apparatus as defined by claim 4 wherein each packer includes means actuable by the force of explosion of the explosive charge to cause an increase in the tightness of the packer in the tubular member.

10. Apparatus as defined by claim 4 wherein each packer is adapted to be radially expanded by longitudinal pressure, and includes a pressure plate on the side nearest the explosive charge, the pressure plate being movable longitudinally relative to the rod by the force of the explosion of the explosive charge so as to further tighten the packers in the tubular member.

11. Apparatus for joining pipe sections within
    a coupling adapted to surround the adjacent ends of two abutting pipe sections,
    said coupling being made of a material more elastic than the material of the pipe sections,
    said apparatus comprising
    a retaining ring surrounding and closely engaging the coupling,
    a rod adapted to be inserted into said pipe ends to span the abutment,
    a packer adapted to be expanded by axial force on said rod on each side of said abutment operable to enclose a space having a length less than the coupling length,
    means of said rod adapted to be operated, by manipulation of said rod, to expand the packers to sealingly engage the respective pipe sections,
    a longitudinally extending passageway in said rod terminating intermediate said packers,
    a lateral passageway in said rod providing communication between said longitudinal passageway and said enclosed space,
    an explosive charge on said rod, and
    an electrical conductor in said passageways leading to said explosive charge.

References Cited by the Examiner

UNITED STATES PATENTS 2,779,279  1/57  Maiwurm _____ 113—44

FOREIGN PATENTS 766,741  1/57  Great Britain.

OTHER REFERENCES

Explosives Form Tubes With and Without Dies, by Jacob Savitt, American Machinist, pp. 135–137, June 15, 1959.

CHARLES W. LANHAM, *Primary Examiner.*